Nov. 16, 1965  V. C. ANDERSON  3,217,765
EAR CORN ATTACHMENT FOR ROLLER MILLS
Filed April 30, 1962  5 Sheets-Sheet 1

INVENTOR.
VERN C. ANDERSON
BY
ATTORNEYS

INVENTOR.
VERN C. ANDERSON
BY
ATTORNEYS

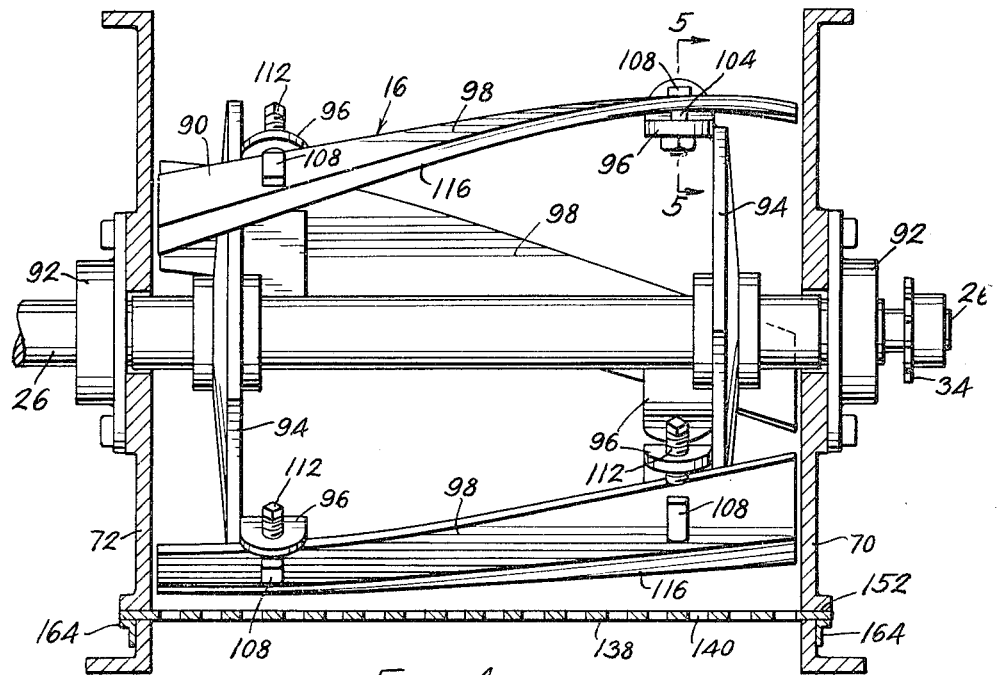
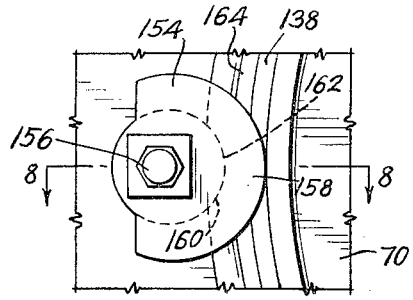
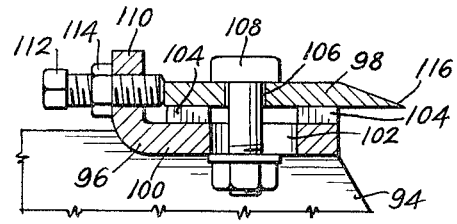
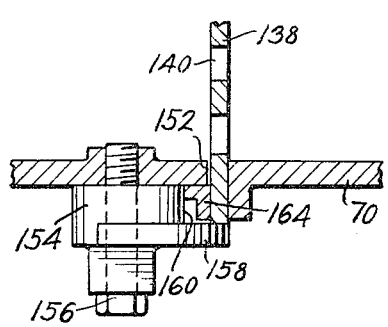
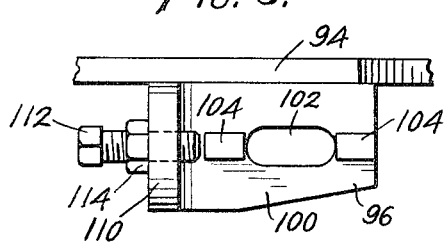

Nov. 16, 1965   V. C. ANDERSON   3,217,765
EAR CORN ATTACHMENT FOR ROLLER MILLS
Filed April 30, 1962   5 Sheets-Sheet 5

INVENTOR.
VERN C. ANDERSON
BY
ATTORNEYS

United States Patent Office 3,217,765
Patented Nov. 16, 1965

3,217,765
EAR CORN ATTACHMENT FOR ROLLER MILLS
Vern C. Anderson, Hastings, Nebr., assignor to Western Land Roller Company, Hastings, Nebr., a corporation of Nebraska
Filed Apr. 30, 1962, Ser. No. 191,127
5 Claims. (Cl. 146—71)

This invention relates to feed mills and, more particularly, to roller mills especially equipped to chop and grind ear corn into a uniform relatively finely divided state.

Roller mills of one type or another have been used for grinding feed for many years. Some of the modern roller mills have even been fitted with specially designed attachments for the purpose of handling ear corn which cannot be chopped and ground satisfactorily with the roller mill alone.

These prior art ear corn attachments for roller mills have, however, proven unsatisfactory for the most part as they are deficient in several significant respects. For example, nearly all of these attachments depend entirely on some type of shearing, shredding or crushing action to perform the primary size reduction of the ear corn preparatory to delivering it to the rollers where the final size reduction is carried out. Others compress or squeeze the feed between a rotating drum and heavy screen which are so located relative to one another that the space therebetween decreases steadily from the intake to the discharge ends.

One of the available ear corn attachments utilizes a corrugated screen as the stationary element across which staggered knives sweep. The construction is such that, even though sharpened knives are used, the clearance that must be maintained between the sharpened edges of the lands of the corrugated screen is so great that a tearing or shearing action results rather than a true cutting action.

The aforementioned prior art attempts to provide a satisfactory ear corn grinding attachment for use with a roller mill, while differing widely in their structural approaches to the problem, all seem to share the same deficiencies which render them more or less unsatisfactory for the purpose intended. First of all, and most important, is the fact that these mills all tend to produce a significant percentage of "fines" due primarily to the fact that they tear rather than cleanly cut the feed and also because they tumble the product excessively before it is discharged to the rollers. In addition, the capacity of these mills is quite low by reason of the inefficient manner in which the primary size reduction is carried out. Finally, the power requirements are excessive in order to operate the units at even moderately high capacity. The latter factor is, of course, also a function of the efficiency of the units as is the capacity.

It has now been found in accordance with the teaching of the instant invention that the foregoing along with several other limitations found in the commercially available units can, in large measure, be overcome through the use of an ear corn attachment for roller mills that utilizes an extremely efficient cutting action to accomplish the primary size reduction as opposed to the tearing and shearing action employed by the majority of the prior art mills equipped with means for handling ear corn. The roller mill herein described also minimizes the interaction between particles of the partially-chopped product before they are delivered to the rollers which factor is the major one contributing to excessive fines and even dust. The cutting action is responsible for a remarkably uniform product that is cut cleanly without leaving stringy shucks to clog lines and conveyor equipment.

The knives or blades are precision-ground and spirally-oriented on a reel rotatable relative to a pair of fixed but adjustable cutter bars which cooperate to simulate a lawn-mower-like action. It is of paramount importance that the knives actually sweep across the cutter bars in scissor-like contact therewith in order to accomplish the desired clean cut; therefore, provision is made for adjusting both the knives and cutter bars to compensate for wear, material lost when the blades are sharpened and to attain this critical relationship originally.

Even the direction of the rotation of the reel with respect to the movement of incoming unchopped material is significant because, until the material is chopped fine enough to pass through the coarse primary screen overlying the rollers, it is continually carried back up by the reel-supported knives for successively fine cuts. This action is, however, accomplished without appreciable interaction between the particles of the material itself which would, otherwise, contribute to a substantial increase in the percentage of fines and dust. In other words, with the exception of the knives and the supports therefor, the reel is open to allow the partially chopped material to enter the spaces between the blades thus preventing it from being crushed and ground between the reel and screen as is the case with some of the prior art machines.

In addition to the above-mentioned features, several other refinements have been incorporated into the mill which contribute to its overall superiority and versatility. These will be mentioned and their significance noted as the detailed description of the apparatus proceeds.

It is, therefore, the principal object of the present invention to provide a novel and improved roller mill equipped with an ear corn attachment.

A second objective is the provision of apparatus of the class above-described which utilizes a lawn-mower-type open reel movable across stationary cutter bars to effect a clean cut without shredding or tearing the material.

Another object is to provide a mechanism for chopping ear corn that produces a remarkably uniform chopped and ground product that minimizes the percentage of unwanted fines and dust.

Still another objective of the invention forming the subject matter hereof is the provision of a reel-type chopper attachment that recirculates the partially-cut product preparatory to delivering same to the rollers until its size is reduced to that which will pass through a coarse screen while, at the same time, preventing unnecessary interaction between the product particles.

An additional object is to produce an ear corn head for roller mills that eliminates most of the crushing and pulverizing of the feed that usually takes place between the reel and associated stationary elements of the apparatus.

Further objects are to provide a roller mill capable of grinding ear corn that is considerably more efficient than the prior art devices for the purpose, has a greater capacity, requires less power for a given output, is relatively inexpensive, trouble-free and easy to service, and a unit of the type described that is rugged, compact, adaptable for use with a variety of different sources of power and decorative in appearance.

Other objects will be in part apparent and in part pointed out specifically hereinafter in connection with the description of the drawings that follows, and in which:

FIGURE 4 is a fragmentary diametrical section to an enlarged scale showing the reel;

FIGURE 5 is a fragmentary section further enlarged and taken along line 5—5 of FIGURE 4 showing the adjustable mounting for the knives;

FIGURE 6 is a fragmentary top plan view of the adjustable mount for the knives with the knives removed;

FIGURE 7 is a fragmentary side elevation to an enlarged scale illustrating the manner in which the screen is removably mounted in the main housing;

FIGURE 8 is a fragmentary section taken along line 8—8 of FIGURE 7;

Figure 1:
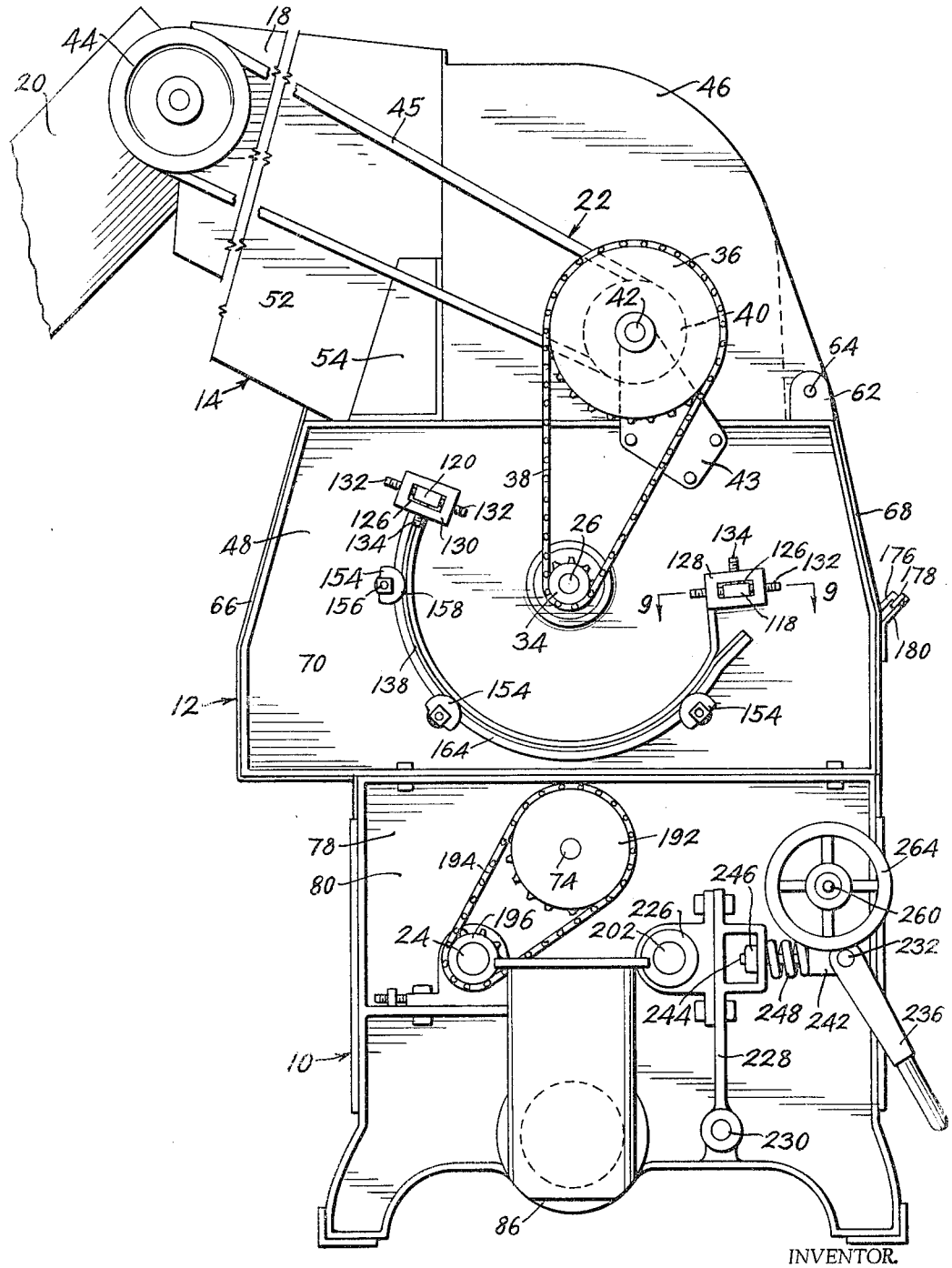
FIGURE 1 is a side elevation of the roller mill and ear corn attachment of the present invention, portions of which have been broken away to conserve space.
Figure 2:
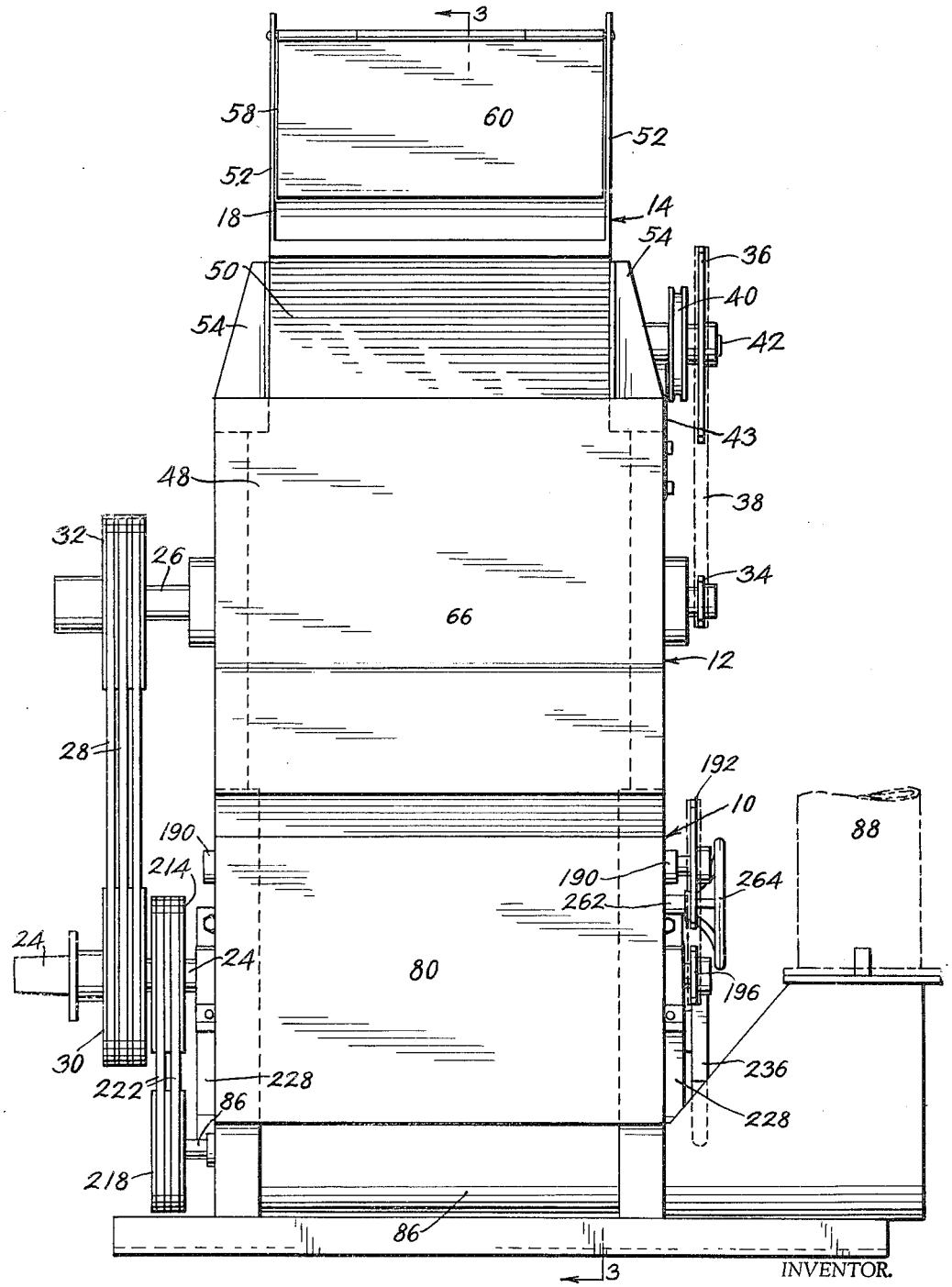
FIGURE 2 is a front elevation thereof.
Figures 3, 14:
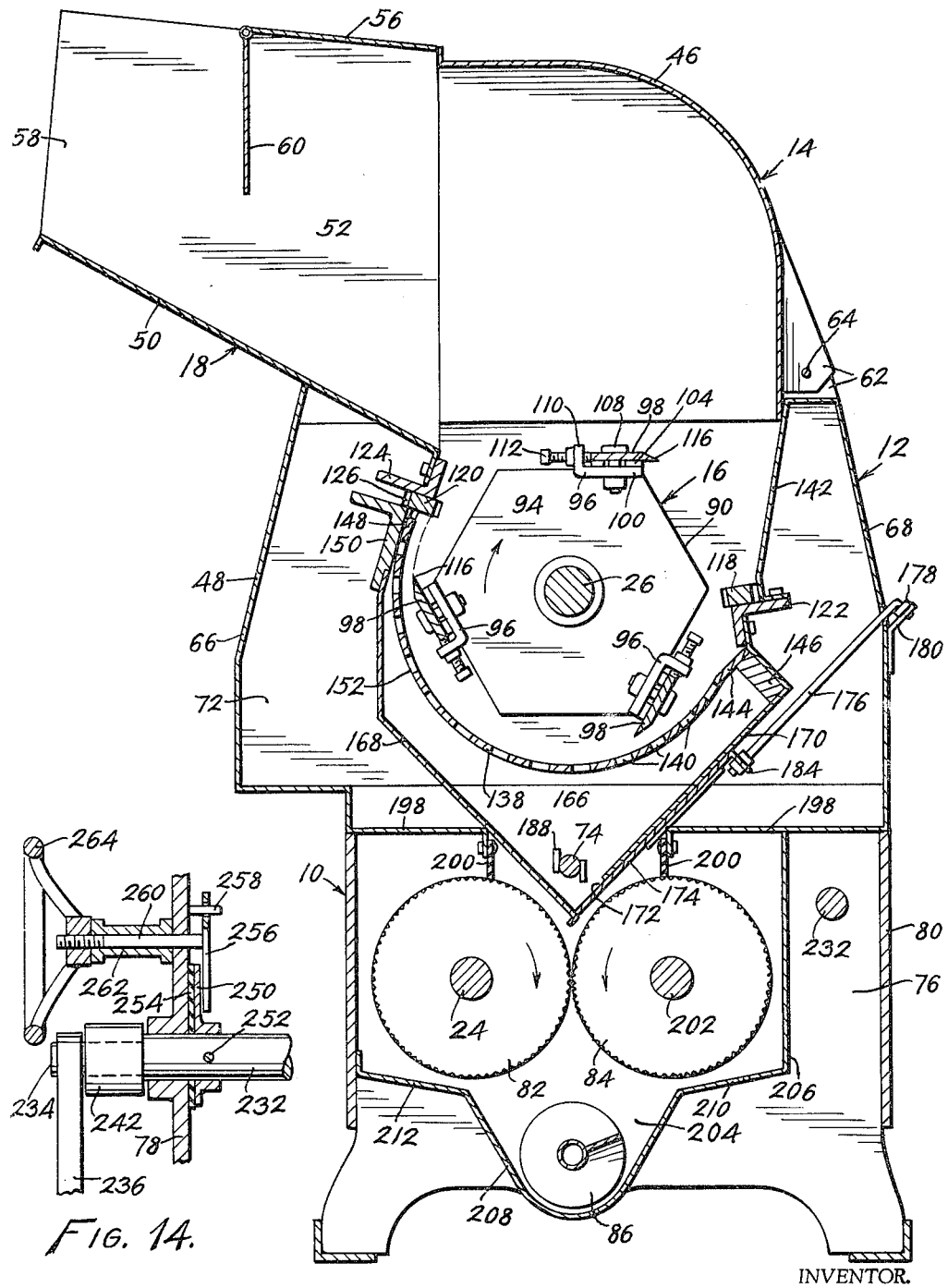
FIGURE 3 is a vertical section taken along line 3—3 of FIGURE 2.

Referring now to the drawings for a detailed description of the present invention, and particularly to FIGURES 1, 2, and 3 for this purpose, the unit will be seen to comprise basically a roller mill assembly, an ear corn grinding head and a hood which have been identified in a general way by reference numerals 10, 12 and 14, respectively. The ear corn head mounts atop the roller mill assembly and accomplishes a primary sizing of the ear corn preparatory to delivering same to the rollers for final grinding. The hood 14 mounts on top of the ear corn head 12 and functions to direct the feed into the reel assembly 16 where the primary sizing operation takes place. This hood includes a chute-forming portion 18 into which the ear corn is introduced. In many applications, the corn is withdrawn from the bottom of a storage bin of some type and must be elevated for delivery into the chute 18 by a conveyor. Such a conveyor has been shown in FIGURE 1 at 20 and it will be seen that power for the conveyor can be derived from the mill by means of a power transfer mechanism that has been designated in a general way by numeral 22.

The main drive shaft of the mill 24 is connectable to the power-take-off of a tractor or other prime mover (not shown) and is connected to the shaft 26 of the reel assembly 16 by means of V-belts 28 and pulleys 30 and 32. The opposite end of reel shaft 26 is provided with a sprocket 34 connected to sprocket 36 by chain 38. A V-belt pulley 40 is mounted on a stub shaft 42 carried by a supporting plate 43 for conjoint rotation with sprocket 36. Thus, by running a V-belt 42 from pulley 40 to a similar pulley 44 on the conveyor or elevator 20, power is supplied by the tractor to operate the latter.

In the particular form shown, the hood 14 actually comprises two separate parts, namely, chute 18 and real cover 46, both of which are attached to the open top of the ear corn head housing 48. The chute 18 has an inclined bottom wall 50 and upstanding sidewalls 52, both of which are bolted more or less permanently to the top of housing 48 by means of mounting brackets 54. The top of the chute is only partially covered by top wall 56, the latter terminating short of the front opening 58 into which the ear corn to be ground is introduced. A swinging gate 60 is hingedly attached to the front edge of the top wall 56 extending part way down to the inclined bottom wall 50 as a means for preventing the partially chopped and ground material from being thrown back out through opening 58 when the reel 16 is in operation.

Immediately behind chute 18 is the reel cover 46 which is hingedly attached to the rear edge of the corn head housing 48 by means of overlapping ears 62 and interconnecting hinge pin 64. Note that plate 43 carrying stub shaft 42 is bolted to the corn head housing 48 rather than the reel cover in order that the latter can be opened without disconnecting chain 38 and V-belt 42 from the sprocket 36 and pulley 40 which are located alongside said cover. The prime function of the cover is to expose the reel assembly 16 so that it can be inspected. In closed position, the cover forms a continuation of the chute.

The ear corn head 12 includes a box-like housing 48 that mounts on top of the roller mill assembly 14 and is bolted or otherwise removably attached thereto. The front wall 66 extends upwardly to the underside of the chute while the rear wall 68 terminates at the hinged edge of the cover. The sidewalls 70 and 72 support the reel assembly 16 therebetween and, therefore, are constructed of a relatively heavy-gage metal or a casting. Inside the housing 48 will be found several deflector plates which cooperate to direct the uncut material into the reel assembly and also the partially-cut material into the rollers. These deflector plates together with the supporting structure therefor are best seen in FIGURE 3 to which reference will be made shortly for a detailed description thereof.

Immediately underneath the reel assembly in the bottom of the housing 48 is an agitator 74 journalled for rotation within suitable bearings carried by the side walls 76 and 78 of the roller mill housing 80. Also journalled for rotation between the sidewalls of the roller mill housing 80 are the fixed rollers 82, adjustable roller 84 and discharge auger 86. Housing 80 forms the base of the unit which can either rest on the ground or be fitted with wheels so that it can be transported from place to place. As shown in FIGURE 2, it will be seen that the horizontal auger 86 can be adapted to feed into a vertically-disposed auger assembly 88 which elevates the product to a height suitable for introduction into a wagon, storage bin or other facility.

Referring particularly to FIGURES 2, and 4–9, inclusive, the reel assembly 16 will be seen to include an open bladed reel 90 rotatable with reel shaft 26 which forms a part thereof. Shaft 26 is journalled for rotation within bearings 92 that are bolted or otherwise secured to the sidewalls 70 and 72 of the housing 48. Sprocket 34 which is a part of the train that powers the elevator 20 is mounted externally on shaft 26.

Transversely spaced polygonal plates or disks 94 are secured to shaft 26 adjacent the inside surfaces of the housing sidewalls and, in the particular form shown, these disks are regular hexagons of identical size. Generally L-shaped knife blades brackets 96 are welded to the inside faces of each disk in equiangularly spaced relation to one another. As illustrated, three brackets spaced 120° apart are provided on each disk located near the intersection of the sides of the polygon as shown most clearly in FIGURE 3. At this point it should be mentioned that the polygonal shape of the disks lends itself quite well to the location of the brackets and alignment of the blades 98; however, it is by no means critical as it is obvious that other shapes could also be used. The same is true, of course, to the hexagonal shape of the plates which is well-suited to a three-bladed reel although a different number of blades (usually a greater rather than a lesser number) could well be employed with a corresponding modification in plate design to accommodate same.

The longer leg 100 of the brackets 96 is welded to the plate 94 as to extend generally in the direction in which the reel is to rotate and each of these legs 100 contains an elongate slot 102 extending in the same direction as shown most clearly in FIGURES 5 and 6. Slide blocks 104 are provided on the outwardly facing surface of leg 100 positioned both in front and behind the slot 102. These slide blocks support the blade for slideable movement in the direction of the slots. Each blade has an opening 106 (FIGURE 5) therethrough sized to receive a bolt fastener 108 which holds the blade in adjusted position relative to the slot 102 with which it registers. The upturned leg 110 of the L-shaped brackets 96 carries a set screw 112 that is threaded therethrough into position to engage the rear edge of the blade thus forming an extendible and retractable stop capable of adjusting the blade and maintaining same in adjusted position in cooperation with bolt 108. A lock nut 114 is preferably added to the set screw to prevent its becoming loosened.

Both the brackets 96 and associated plates 94 are offset angularly from one another to accommodate the blades 98 that comprise segments of a helix. All the blades are the same size and shape and are identically located with respect to the axis of rotation of the reel. The leading edge 116 of each blade is sharpened to a knife edge that sweeps across the first cutter bar 118 and second cutter bar 120 with a scissor-like cutting action. It is of utmost importance to the successful operation of the unit that the blades and cutter bars be so adjusted relative to one another that the knife edge 116 actually comes into contact with the stationary cutter bars as it sweeps across them as this is the relationship that is responsible for the efficient clean cut realized and the resultant increased capacity at lower power. Obviously, as the blades wear against the cutter bars through continued use, small gaps may develop between these elements; however, this condition is an abnormal one that cuts down on the efficiency of the unit and steps should be taken to grind the blades and adjust same until the desired relationship is again established.

Figure 9:
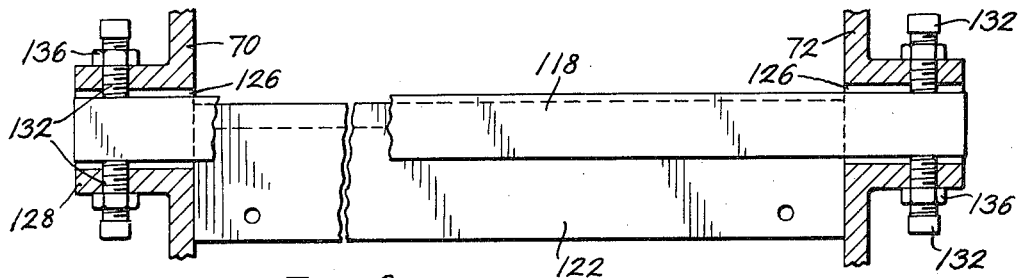
FIGURE 9 is a fragmentary section to an enlarged scale taken along line 9—9 of FIGURE 1 showing the adjustable mount for the stationary cutter bars with portions broken away to conserve space.

As can best be seen in FIGURES 1, 3 and 9, the cutter bars 118 and 120 rest against heavy angle iron supports 122 and 124 that extend transversely between the sidewalls of the housing 48. Support 122 lies underneath cutter bar 118, whereas, angle iron 124 lays along the top of cutter bar 120 because, with the reel rotating in the direction of the arrow in FIGURE 3, the blades 98 will engage the stationary cutters and tend to force same against their supports.

The cutter bars merely rest against their respective angle iron supports and are not attached thereto because some relative movement of the bars must be provided for in order to maintain the proper relationship between the reel, blades and bars. Accordingly, the extremities of each cutter bar project through oversize openings 126 in the sidewalls of the housing 48 where they are received in an intergrally-formed rectangular collars 128 and 130. Each collar is provided with a pair of set screws 132 which engage opposite edges of the cutter bar and move same in or out relative to the reel and blades carried thereby. A third set screw 134 engages one of the faces of the cutter bar in position to press same against the associated angle iron support member. Lock nuts 136 are preferably provided on each set screw to maintain the cutter bars in adjusted position. Means are thus provided for accomplishing fine adjustments between the cutter bars, blades and reel axis to insure a clean dust-free cut with minimal power requirements.

The screen 138 located beneath the reel is most conveniently described in connection with FIGURES 1, 3, 4, 7 and 8 to which reference will now be made. This screen is of heavy gage metal containing a multiplicity of openings 140 rather than the woven-wire mesh type. While it may be possible to fabricate a woven screen capable of withstanding the considerable abuse to which it is subjected in the unit, the perforated plate is the better solution.

The screen is semi-circular in cross-section and extends slightly less than half-way around the reel in fixed spaced relation to the sharpened edges of the blades. It is important to note that the blades do not engage the surface of the screen or, in fact, move very close to it, the cutter bars being relied upon almost exclusively for the primary size reduction operation. Furthermore, the space between the screen and blades remains constant so there is no wedging action as the material progresses from the cutter bar 118 at the intake end of the reel assembly to cutter bar 120 at the outlet thereof. Of equal importance is the fact that the reel is quite open between the blades thus permitting the material being sized to move into the center of the reel without being crushed between it and the screen, the latter action resulting in the production of considerable fines and dust. The prime function of the screen is, therefore, to retain the partially cut material in place to be acted upon by the blades and cutter bars until it is reduced in size to the point where it will pass through the perforations therein and, most important, to hold the material in position to be lifted by the rotating reel against cutter bar 120. The direction of rotation of the reel is quite significant because before any large pieces of material can possibly enter the space between the reel and screen, they must be cut into medium sized chunks by the blades moving across the lead cutter bar 118. Until this happens, the material is confined within the hood and throat defined between the reel and partition wall 142 (FIGURE 3) that extends upwardly from its point of attachment to angle iron support 122 in diverging relation to the hinged rear edge of the hood. This same action cooperates with the direction of movement of uncut material into the unit by means of chute 18 thus contributing to a uniform unidirectional flow. In other words, were the reel to be rotated in the opposite direction, it would tend to reverse the flow of material entering the machine and throw it back out through opening 58. In addition, most of the incoming material would by-pass cutter bar 120 and move all the way to the rear of the unit before it could be picked up by the reel and returned to said cutter bar for initial sizing.

Once the material enters the space between the reel and screen, it generally stays in close proximity to the reel until it is reduced in size to the point where it will pass through the openings 140. It does not, as might be expected, move back up on top of the reel to interfere with the incoming uncut material because, when the blades cut a piece of material against cutter bar 120, the severed portions will either fall back down between the reel and screen or back through the open reel itself between the blades thereof due to their being spaced quite widely apart.

In order to take maximum advantage of the direction of rotation of the reel, the screen is tilted so that its discharge end adjacent bar 120 is located above the intake end immediately underneath cutter bar 118. The leading-edge 144 of the screen is bent out slightly and rests upon a transverse support member 146 that lies underneath but parallel to angle support 122. The trailing edge 148 of the screen, on the other hand, rests against the face of an L-shaped transverse support member 150 which extends along the opposite face of cutter bar 120 from that against which angle iron support 124 rests. The screen is not, however, attached to supports 146 and 150, but rather, merely rests thereagainst.

Slots 152 are provided in the sidewalls 70 and 72 shaped to conform with the cross-section of the screen 138 into which the side edges of the latter project. These slots provide means whereby the screen may be withdrawn and repaired if necessary or interchanged with another having different size apertures. The screen is prevented from shifting back and forth within the slots by rotatable cam-type locking elements 154 of the type shown most clearly in FIGURES 7 and 8. These locks are rotatable about an eccentrically-located axis defined by bolt 156 threaded into the sidewalls 70 and 72 of the housing alongside the slots 138 therein. Each lock includes an ear 158 which is eccentric with respect to the axis of rotation of the lock and in one rotarial position overlaps the edge of the screen to hold the latter in place. In another rotarial position, ear 158 lies completely to one side of the screen thus permitting the latter to be withdrawn from the housing 48 through one of slots 152.

On occasion, it may be desirable to seal the gap between the oversize slot 152 and screen 138. Lock 154 is provided with a cam surface 160 for this purpose which is generally circular although eccentric with respect to the axis of the lock. Cam 160 fits into a similarly shaped notch 162 in the outer edge of a deformable sealing strip 164 which borders the slots 138 and is forced against the screen by said cam when ear 15 is in position overlying the edge thereof.

FIGURE 6 most clearly reveals the trough 166 formed beneath the screen and immediately above the contacting surfaces of rollers 82 and 84 by downwardly and inwardly convergent trough-forming walls 168 and 170. Wall 168 is attached to bracket 150 while wall 170 is attached to cutter bar support 122 and receives some additional bracing from element 146 as shown. Wall 170 terminates short of wall 168 leaving a gap 172 therebetween through which the partially-chopped product that has passed the screen enters the rollers. This gap or opening 172 is adjustable by means of gate 174 which slides along the underside of wall 170 and is controlled by an operating mechanism which, in the particular form shown, consists of link 176, pivoted operating handle 178 and externally-located mounting bracket 180.

Figure 12:
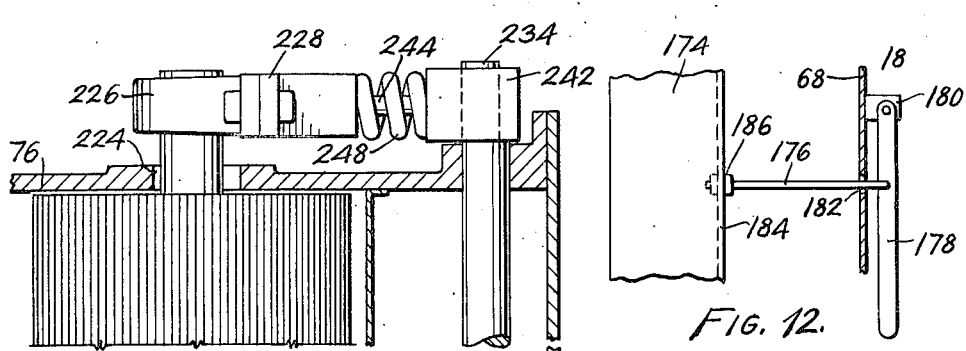
FIGURE 12 is a fragmentary detail, portions of which have been shown in section, illustrating the operating lever which is used to open and close the gate separating the chopping section from the roller section of the unit.
Figure 11:
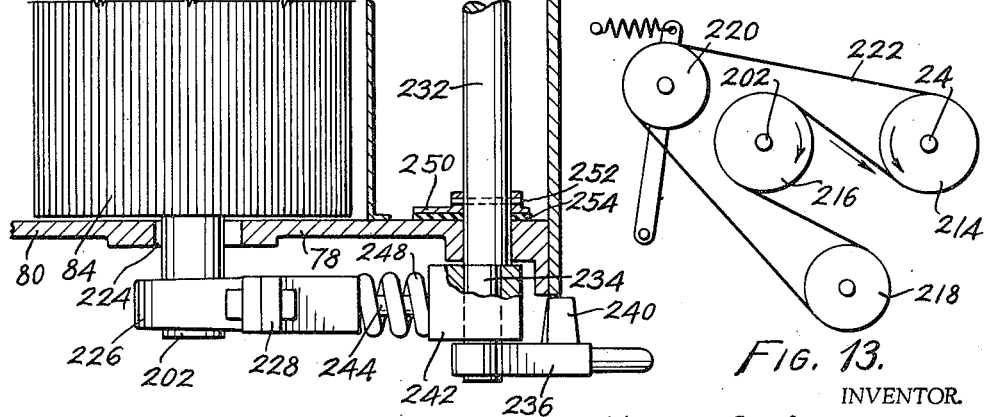
FIGURE 11 is a fragmentary section slightly enlarged and with portions broken away to conserve space showing one of the rollers and the mechanism by which the spacing therebetween is adjusted.

The details of the gate assembly are best shown in FIGURE 12 wherein it will be seen that wall 68 of housing 48 has an aperture 182 therein for the passage of the link 176. This link has its lower extremity attached to a downturned flap 184 on the gate by means of a flexible coupling 186 while the upper end thereof is connected pivotally to the operating handle 178 at a point spaced from its pivotal connection 186 to bracket 180. Thus, by swinging the handle away from wall 68, the gate opens and admits the chopped material to the rollers.

Figure 10:
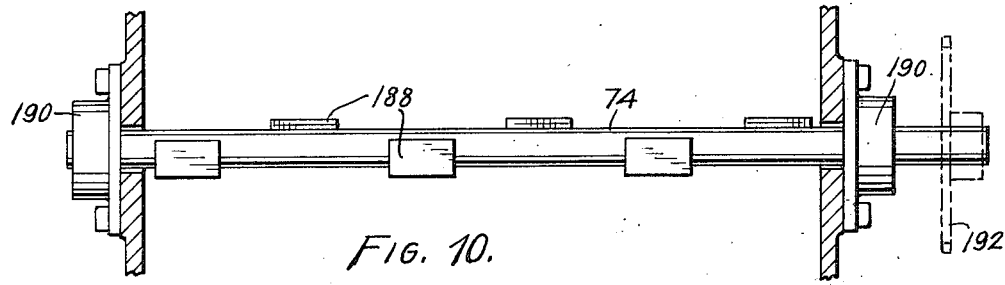
FIGURE 10 is a fragmentary section to an enlarged scale showing the paddle-type agitator.

In units of this general type, there is always the problem of the chopped material, which is relatively coarse, cavitating and refusing to flow through opening 172 down between the rollers. This problem is, however, satisfactorily eliminated by providing the agitator 74 adjacent the confluence of the trough-forming walls 168 and 170 as shown in FIGURES 1, 3 and 10. It comprises merely a series of small rectangular paddle-forming blocks 188 welded or otherwise attached to the rotating shaft at spaced intervals in angularly disposed relation to one another. The shaft is, of course, journalled in suitable bearings 190 and carries a sprocket 192 on one end thereof from which power is derived to turn same from chain 194 and sprocket 196 on roller shaft 24, the latter being the shaft connected directly to the power take-off of the tractor.

Reference will now be made to FIGURES 1, 2, 3, 11, 13 and 14 for a description of the roller mill assembly 14. The two-part bottom wall 198 of housing 48 receives the trough-forming portion 166 of walls 168 and 170. Wipers 200 are bolted to the down-turned flanges of wall 198 in position to sweep the surface of the rollers. Roller shaft 24 is rotatable in fixed position and a second roller shaft 202 is adjustable relative to the first and is journalled for rotation in spaced parallel relation. The grooved grinding or crushing rollers 82 and 84 are mounted on these shafts in tangential contacting relation as shown in FIGURE 2. The rollers are mounted directly underneath gate 174 so as to receive the chopped material issuing from the trough.

Both rollers along with auger 86 are contained within a compartment 204 formed in the main housing 80 by means of a partition wall 206 that extends downwardly along the outside of roller 84, then downwardly and inwardly to a point approximately underneath the axis of rotation of roller 84, around the underside of the auger and finally upwardly and outwardly along the bottom of roller 82, to its point of attachment with the main housing. Thus, wall 206 provides a trough-forming portion 208 containing the auger and a pair of inclined wall portions 210 and 212 alongside thereof that cooperate to direct the ground product into the trough where it is discharged to a suitable storage facility.

Figure 13:
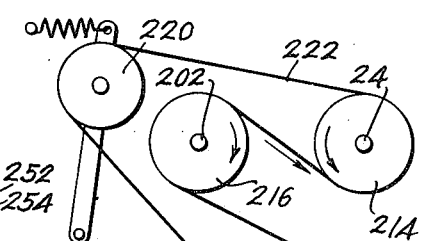
FIGURE 13 is a schematic to a reduced scale showing the belt-drive mechanism; and, FIGURE 14 is a fragmentary sectional view showing the brake assembly by which the adjusted relation between the rollers is maintained.

Power for driving roller 84 and auger 86 is derived from roller shaft 24 as shown in FIGURES 2 and 13, particularly the latter. As aforementioned, sprocket 196 used to drive the agitator assembly is mounted on one end of shaft 24; whereas, the other end carries a multiple-groove V-belt pulley 214. Similar pulleys 216 and 218 are provided on the auger shaft and adjustable roller shaft. A belt-tensioning idler 220 (FIGURE 13) is also necessary to maintain a constant tension on the belts when shaft 202 is adjusted relative to shaft 24 for purposes of varying the spacing between the rollers. The V-belts 222 interconnecting the several pulleys of this system are reeved to turn the rollers in opposite directions and, specifically, as shown by the arrows in FIGURES 3 and 13 which direction, of course, carries the product through the rollers and down onto the auger.

Finally, the mechanism by which the spacing between the rollers is adjusted and maintained will be set forth in connection with FIGURES 1, 2, 11 and 14 where it is most clearly revealed. Shaft 202 carrying roller 84 is mounted within a pair of horizontally elongate openings 224 in the sidewalls 76 and 78 of housing 80 which permit said shaft to move back and forth in relation to fixed shaft 24. The bearings 226 journalling this shaft 202 are carried on the upper end of rocker arms 228 that are pivotally attached to opposite sides of the housing by means of pivotal connections 230.

Another shaft 232 having eccentric end portions 234 is mounted for rotation between the side walls 76 and 78 of housing 80 in spaced parallel relation to shaft 202. An operating lever 236 is attached to one of the eccentric end portions and is used to rotate same. If desired, this operating lever may be provided with a pointer 240 as shown which moves along a scale provided on the housing that indicates to the operator the spacing between the rollers.

The eccentric portions 234 of shaft 232 carry a pair of collars 242 within which said shaft can rotate. These collars are, in turn, connected to their respective lever arms 228 by means of rigid link 244 that can tilt slightly as the rocker arm moves through its arcuate path. Thus, as shaft 232 is rotated by operating lever 236, the collars 242 carried on the eccentric end portions 234 either push or pull on links 244 causing the rocker arms to pivot and vary the position of shaft 202 relative to shaft 24. It is, of course, obvious that by varying the roller spring the particle size of the final product can be controlled.

As some times occurs, a rock or similar piece of foreign matter may find its way past the reel, through the screen and into the rollers where it is likely to break same unless provision is made for releasing them. For this reason, a yieldable connection is preferably provided between the two shafts 202 and 232. Such a connection comprises merely allowing the rocker arms to slide along links 244 toward the collars 242 while biasing same apart and against a rigid stop 246 (FIGURE 1) by means of compression springs 248 located between said collars and arms. The maximum spacing between the shaft 202 and eccentric portions of shaft 232 is thus fixed while the minimum spacing is not. In this way, a hard object such as a rock passing between the rollers will allow roller 84 to move away from roller 82 as compression springs 248 merely compress and let shaft 202 move closer to the eccentric portions 234 of shaft 232.

In order to hold shaft 232 in an adjusted rotarial position, it is provided with a disk-type brake shoe 250 attached thereto by a pin 252. The inside of housing wall 78 carries a friction disk 254 fixed in place thereon and in face-to-face relation to the shoe 250. A pressure plate 256 is mounted inside the shoe on an aligning pin 258 depending from end wall 78 which prevents same from turning yet permits it to move toward and away from the shoe. An actuating rod 260 is attached to the outer face of the pressure plate and extends out through the wall 78 of the housing into collar 262. The outer extremity of this rod is threaded and carries a handwheel 264. By turning the handwheel in a direction to draw the rod 260 out of the housing, the pressure plate is pulled tight against shoe 250 which, in turn, engages the friction plate 254 thus holding the shaft 232 and associated elements in adjusted position.

Having thus described the several useful and novel features of the roller mill with ear corn grinding attachment of the present invention, it will be seen that the many worthwhile objectives for which it was designed have been achieved. Although but a single specific embodiment of the invention has been illustrated in the accompanying drawings, I realize that certain changes and modifications therein may well occur to those skilled in the art within the broad teaching hereof, hence, it is my intention that the scope of protection afforded hereby shall be limited only insofar as said limitations are expressly set forth in the appended claims.

What is claimed is:

1. The ear corn chopping attachment for use with a roller mill of the type having an open topped housing containing a pair of tangentially disposed rollers mounted for rotation about spaced substantially parallel axes which comprises, a housing open both top and bottom adapted to fit on top of the roller mill housing and form an upstanding continuation thereof, a shaft journalled for rotation within the attachment housing in spaced substantially parallel relation above and between the rollers, blade-supporting disks mounted on opposite ends of the shaft for rotation therewith in normal relation to its axis, at least three sharpened blades mounted in angularly spaced relation on the periphery of the disks and cooperating therewith to define an open reel, the sharpened leading edges of the blades defining a locus of points lying on the surface of the cylinder whose axis is coincident with the axis of rotation of the reel, a first stationary cutter bar mounted in the attachment housing on one side of the reel in position to receive the sharpened leading edges of the blades with a scissor-like cutting action, a second stationary cutter bar mounted on the opposite side of the reel bearing the same relationship to the sharpened leading edges of the blades as the first of said cutter bars, a screen encircling the underside of the reel in spaced relation thereto and extending from the first cutter bar to the second, power transfer means operatively interconnecting one of the rollers and the reel adapted to turn the latter in a direction such that the blades move downwardly across the first cutter bar, a chute mounted atop the attachment housing opening onto the reel, said chute including an inclined passage adapted to receive material to be chopped and ground and deliver same to the reel substantially tangentially in the same direction in which the top of said reel is moving, wherein the attachment housing includes a pair of interior partition walls extending from the underside of the cutter bars outside the screen to a point of convergence therebeneath, one of said partition walls including an adjustable gate at its lower extremity, said walls and gate cooperating to define a trough disposed above the rollers adapted to direct and regulate the amount of chopped material delivered thereto, and means comprising an agitator journalled for rotation in spaced substantially parallel relation below the reel shaft underneath the screen and adjacent the bottom of the trough defined by the partition walls.

2. The ear corn chopping attachment for use with a roller mill of the type having an open topped housing containing a pair of tangentially disposed rollers mounted for rotation about spaced substantially parallel axes which comprises, a housing open both top and bottom adapted to fit on top of the roller mill housing and form an upstanding continuation thereof, a shaft journalled for rotation within the attachment housing in spaced substantially parallel relation above and between the rollers, blade-supporting disks mounted on opposite ends of the shaft for rotation therewith in normal relation to its axis, at least three sharpened blades mounted in angularly spaced relation on the periphery of the disks and cooperating therewith to define an open reel, the sharpened leading edges of the blades defining a locus of points lying on the surface of the cylinder whose axis is coincident with the axis of rotation of the reel, a first stationary cutter bar mounted in the attachment housing on one side of the reel in position to receive the sharpened leading edges of the blades with a scissor-like cutting action, a second stationary cutter bar mounted on the opposite side of the reel bearing the same relationship to the sharpened leading edges of the blades as the first of said cutter bars, a screen encircling the underside of the reel in spaced relation thereto and extending from the first cutter bar to the second, power transfer means operatively interconnecting one of the rollers and the reel adapted to turn the latter in a direction such that the blades move downwardly across the first cutter bar, a chute mounted atop the attachment housing opening onto the reel, said chute including an inclined passage adapted to receive material to be chopped and ground and deliver same to the reel substantially tangentially in the same direction in which the top of said reel is moving, wherein the attachment housing has at least one slot therein shaped to conform with the edges of the screen and sized to pass same so that it can be removed, and rotatable latch-forming means provided on the attachment housing, said latch means including portions rotatable into position overlying the slot for purposes of retaining the screen in place.

3. The ear corn attachment as set forth in claim 1 in which the angular spacing from the first cutter bar to the second measured in the direction of reel rotation is substantially greater than 180°.

4. The ear corn attachment as set forth in claim 1 in which the first cutter bar is located in approximately the same horizontal plane as the reel axis and the second cutter bar is elevated a substantial distance above said horizontal plane.

5. The ear corn attachment as set forth in claim 1 in which the agitator means comprises a shaft housing a plurality of paddle-forming elements thereon.

References Cited by the Examiner

UNITED STATES PATENTS

| | | | |
|---|---|---|---|
| 900,255 | 10/1908 | Ball | 146—121 |
| 1,639,807 | 8/1927 | Oppenheim et al. | 146—117 X |
| 1,645,770 | 10/1927 | Olson | 146—117 |
| 1,928,141 | 9/1933 | Stresau | 146—117 X |
| 1,929,586 | 10/1933 | Holland-Letz | 146—121 |
| 2,873,921 | 2/1959 | Christiansen | 241—157 |

J. SPENCER OVERHOLSER, *Primary Examiner.*

ROBERT A. O'LEARY, *Examiner.*